(12) United States Patent
Kopf et al.

(10) Patent No.: US 7,105,966 B2
(45) Date of Patent: Sep. 12, 2006

(54) ELECTRIC MOTOR

(75) Inventors: Frank Kopf, Ottersweier (DE); Peter Bruder, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/488,999

(22) PCT Filed: Dec. 24, 2002

(86) PCT No.: PCT/DE02/04722

§ 371 (c)(1),
(2), (4) Date: Mar. 10, 2004

(87) PCT Pub. No.: WO03/067738

PCT Pub. Date: Aug. 14, 2003

(65) Prior Publication Data

US 2004/0232787 A1 Nov. 25, 2004

(30) Foreign Application Priority Data

Feb. 9, 2002 (DE) .............................. 102 05 402

(51) Int. Cl.
*H02K 5/00* (2006.01)
(52) U.S. Cl. ...................................... 310/89

(58) Field of Classification Search .................. 310/88, 310/89, 71, 58, 64, 68 R
See application file for complete search history.

(56) References Cited

U.S. PATENT DOCUMENTS

| | | | |
|---|---|---|---|
| 4,727,274 A * | 2/1988 | Adam et al. ................. | 310/239 |
| 5,192,888 A * | 3/1993 | Fleer ........................... | 310/71 |
| 5,424,600 A * | 6/1995 | Ishikawa et al. ............ | 310/220 |
| 6,570,284 B1 * | 5/2003 | Agnes et al. ................. | 310/89 |
| 6,664,682 B1 * | 12/2003 | Williams et al. ............. | 310/89 |
| 6,753,629 B1 * | 6/2004 | Doi et al. .................... | 310/68 D |

FOREIGN PATENT DOCUMENTS

| | | |
|---|---|---|
| DE | 196 46 617 A1 * | 11/1996 |
| JP | 57078346 A * | 5/1982 .................. 310/71 |

* cited by examiner

*Primary Examiner*—Darren Schuberg
*Assistant Examiner*—Nguyen N. Hanh
(74) *Attorney, Agent, or Firm*—Ronald E. Greigg (57) ABSTRACT

An electric motor for blowers in motor vehicles, having a motor housing which includes as its housing components a pole housing and a bearing lid mounted on the pole housing, and having an electronics housing for receiving electronic components of an electronic unit. To lower the production costs for the electric motor, the electronics housing is embodied in two parts at least one of which is attached to a housing component of the motor housing.

19 Claims, 6 Drawing Sheets

ELECTRIC MOTOR

CROSS-REFERENCE TO RELATED APPLICATIONS

This application is a 35 USC 371 application of PCT/DE 02/04722 filed on Dec. 24, 2002.

BACKGROUND OF THE INVENTION

1. Field of the Invention

The invention is directed to an improved electric motor, particularly for blowers in motor vehicles.

2. Description of the Prior Art

It is known for the control electronics for electronic speed control of the blower to be accommodated, along with corresponding electronic components for suppressing distortion from the motor, in an electronics housing that is protected from splashing water, and to make the electrical connection with the motor via a cable extended out of the electronics housing. The electronics housing is secured as a separate component to a body of the blower or fan driven by the electric motor.

SUMMARY AND ADVANTAGES OF THE INVENTION

The electric motor of the invention has the advantage that the electric motor is available, with the complete electronic unit, as a preassembled structural unit that need merely be coupled to the blower housing and the blower wheel of the blower. This dispenses with a separate electronics housing, and the electrical connection with the stator and/or rotor of the electric motor, for instance to the bushes of the electric motor embodied as a commutator motor, can be made directly without a cable or a cable leadthrough. If preferably at least one of the two housing parts of the two-part electronics housing is formed integrally as a unitary, one-piece component with a housing component, that is, onto the pole housing or the bearing lid, then one of the two separate housing parts is dispensed with, and assembly is also simplified. Overall, a reduction in production costs is thus attained.

In an advantageous embodiment of the invention, one housing part of the electronics housing is embodied as a bottom shell protruding radially from the motor housing, and the other housing part of the electronics housing is embodied as a cover or lid tightly closing off the bottom shell. Preferably, the lid of the electronics housing is formed integrally as a unitary, one-piece component with the bearing lid, and the bottom shell of the electronics housing is formed integrally as a unitary, one-piece component with the pole housing of the motor housing. The electronics housing is thus realized without any additional component whatever, making it possible to minimize assembly costs.

In an advantageous embodiment of the invention, one housing part is formed by the bearing lid itself, on which the other housing part, embodied as a housing cap, is fastened. This kind of structural design is advantageous whenever enough axial installation space for building in the electric motor is available. In this structural design, all that has to be made as an individual part is the housing cap. If that part is made from metal, it can take on an additional function as a cooling sink for components of the electronic unit. The electronic components can either be mounted directly on the cap bottom of the housing cap or on the bearing lid itself. In the latter case, a thermally conductive connection of the electronic unit with the housing cap is required.

In an advantageous embodiment of the invention, the housing cap is mounted only in a central region of the bearing lid, so that in the peripheral region of the bearing lid, a circle of perforations with ventilation holes for ventilating the motor can be provided.

If a commutator motor is used as the electric motor, then in all cases the bearing lid of the motor housing can at the same time be used as a brush holder; as a result, a close arrangement of electronics and brushes is attained, and the electrical connection can be made by short conductor struts.

BRIEF DESCRIPTION OF THE DRAWINGS

The invention is described in further detail herein below, in conjunction with the drawings, in which:

FIG. 11, a fragmentary end view (FIG. 11a) and side view (FIG. 11b) of a modified guide rail in the electronics housing of FIG. 9;

FIG. 12, a fragmentary side view of a plug contact in the electronics housing, before the installation in the electronics housing (FIG. 12a) and after installation (FIG. 12b);

DESCRIPTION OF THE PREFERRED EMBODIMENTS

Figure 1:
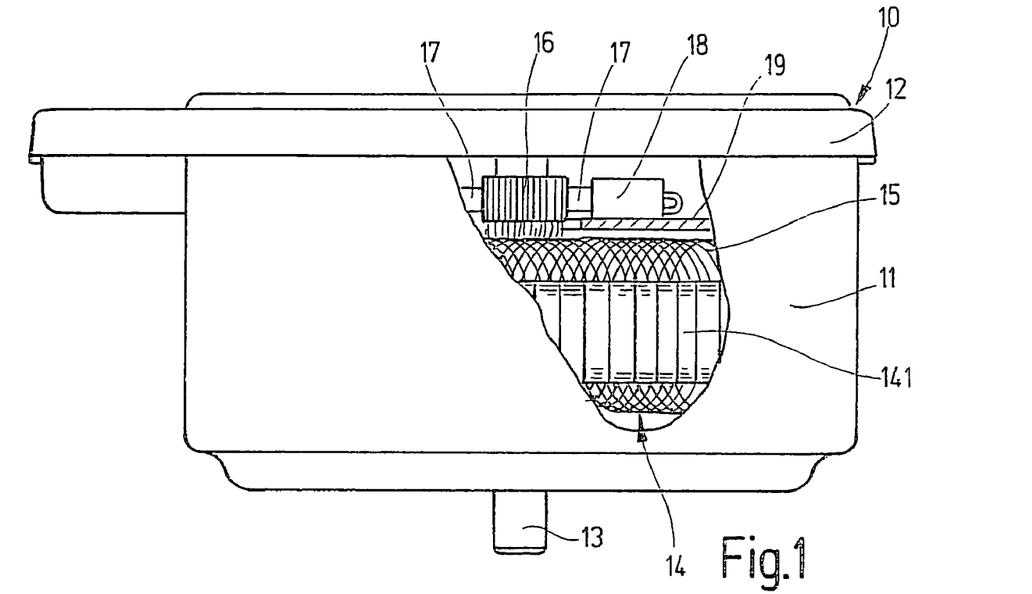
FIG. 1 is a side view of an electric motor, embodied as a commutator motor, with the motor housing and stator shown partly cut open.

The electric motor schematically shown in side view in FIG. 1 is embodied as a commutator motor, preferably as a DC motor with permanent-magnet excitation, and serves to drive a cooling blower in a motor vehicle. The electric motor has a motor housing 10, which as its housing components includes a pole housing 11 and a caplike bearing cover or lid 12, which is placed against the face end of the pole housing 11 and in the case of a cup-shaped embodiment of the pole housing 11 closes off the opening of the cup. A rotary bearing, not shown here, is integrated with the bearing lid 12, and one end of a rotor shaft 13 is received in this bearing. The other end of the rotor shaft 13 protrudes out from the motor housing 10 and serves to couple a blower wheel supported rotatably in a blower housing. An armature or rotor 14 is seated in a manner fixed against relative rotation on the rotor shaft 13 in a known manner, with a laminated armature or rotor body 141 and a rotor winding 15 placed in it that is surrounded, leaving an air gap, by a stator, not shown in FIG. 1, that is held in the pole housing 11. A commutator 16 is seated in a manner fixed against relative rotation on the rotor shaft 13, and the individual coils of the rotor winding 15 are connected to its commutator laminations. Two diametrically opposed commutator brushes 17 are pressed radially against the commutator 16 by spring force and are connected electrically with an electronic unit 20 for electronic speed control and with plug contacts 27 (FIG. 8) of a connection plug. Each commutator brush 17 is received axially displaceably in a brush quiver 18. The brush quivers 18 are secured in radial orientation with the commutator 16 to a brush holder 19, which in the exemplary embodiment of FIG. 1 is embodied in disklike form and is received in the pole housing 11 in a manner fixed against relative rotation.

Figure 2:
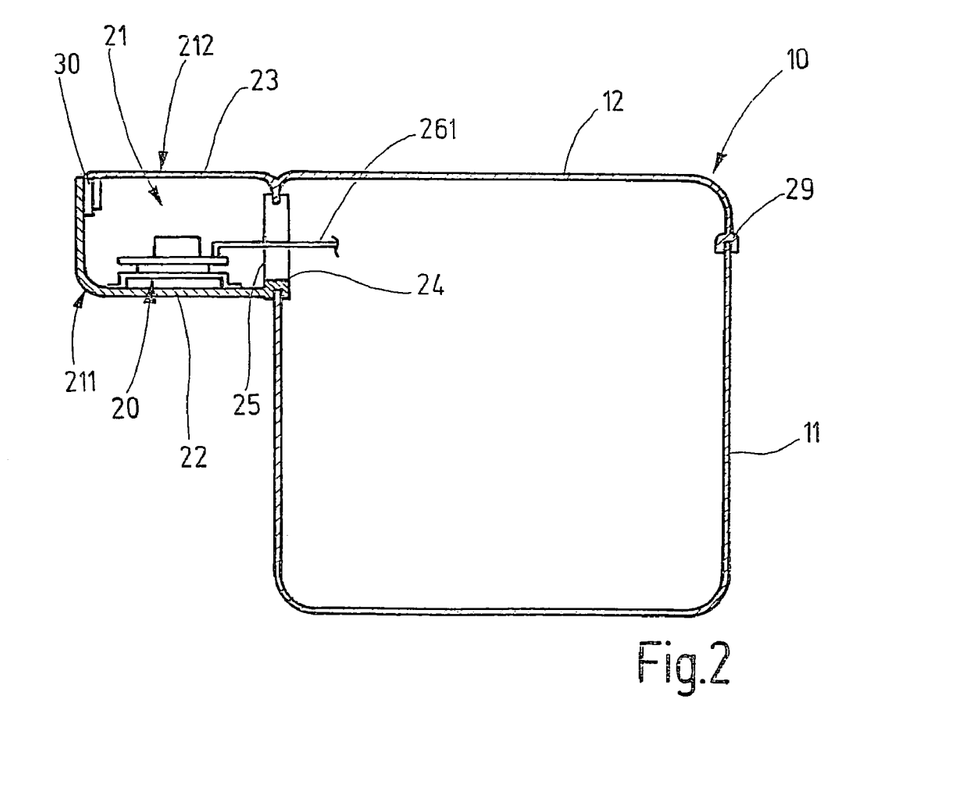
FIG. 2 is a longitudinal section of the motor housing and the electronics housing.

The electronic unit 20, shown schematically in FIG. 2 along with individual electronic components, is disposed in an electronics housing 21 which is attached radially to the motor housing 10. The electronics housing 21 is embodied in two parts 221 and 212, at least one of which is fixed to a housing component of the motor housing 10, that is, to the pole housing 11 or the bearing lid 12, respectively. In the exemplary embodiments of FIGS. 2 and 4–7, at least one housing part 211 or 212 of the electronics housing 21 is formed integrally as a unitary, one-piece component with a housing component 11, 12 of the motor housing 10, and the respective other housing part 212 or 211 is solidly joined to the first housing part 211 or 212; the connection can—as will be explained in further detail hereinafter—be made in various ways.

In the exemplary embodiments of FIGS. 2–7, one housing part 211 of the electronics housing 21 is embodied as a bottom shell 22 protruding radially from the motor housing 10, and the other housing part 212 of the electronics housing 21 is embodied as a caplike lid 23 tightly closing off the bottom shell 22. In the exemplary embodiment of FIG. 2, the lid 23 is formed integrally as a unitary, one-piece component with the bearing lid 12, and the bottom shell 22 is suspended from a wall of the pole housing 11.

Figures 8, 9:
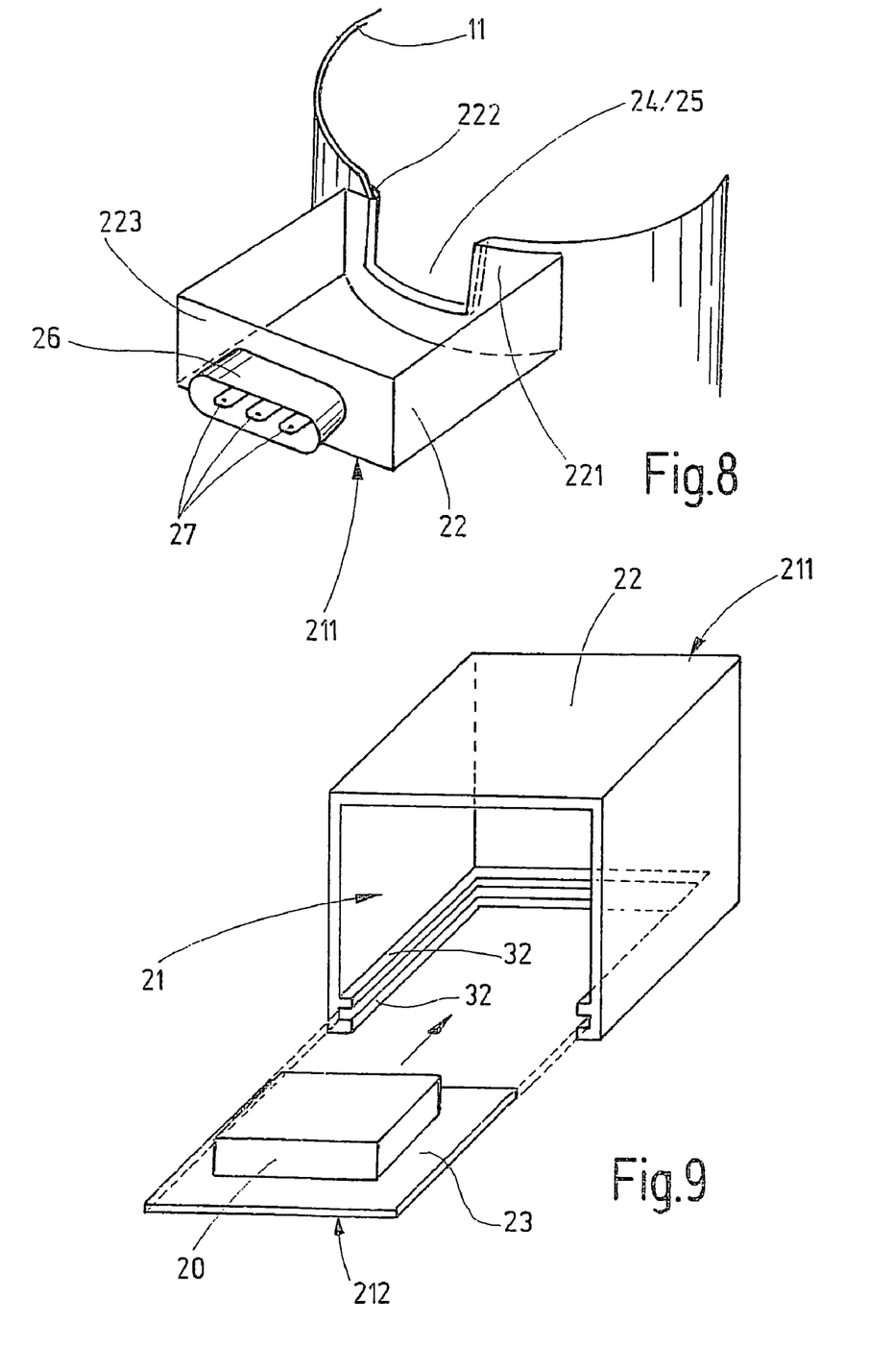
FIG. 8, a perspective fragmentary view of one possible connection between the electronics housing and the motor housing.
FIG. 9, a perspective view of an electronics housing in a further exemplary embodiment.
Figures 10, 11A, 11B, 12A, 12B:
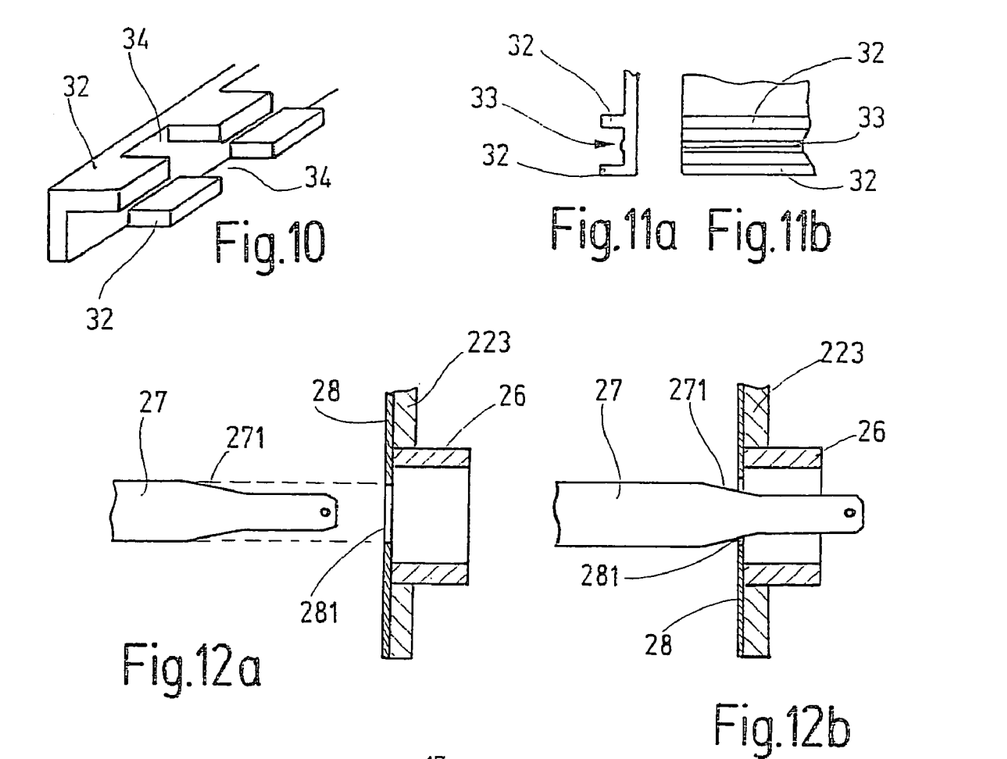
FIG. 10, a fragmentary view of a modification of the guide rails in the electronics housing of FIG. 9.

One possible way of suspending the bottom shell 22 from inside the pole housing 11 is shown in FIG. 8. To that end, the pole housing 11 has a notch 24, beginning at its opening edge, and the bottom shell 22 has a corresponding notch 25 in its back wall 221 that rests on the pole housing 11. Extending around this notch 25 on the back fill 211. a protruding rabbet 222, which when the bottom shell 22 is inserted with its notch 25 into the notch 24 of the pole housing 11 engages the fill of the pole housing from behind and thus fixes the bottom shell 22 protruding radially from the pole housing 11. The electronic unit 20 secured in the bottom shell 22 is electrically contacted with the commutator brushes 17 via stable conductor struts 261 (see FIG. 2) through the congruent notches 24,25. The electrical power supply to the electronic unit 20 and commutator brushes 17 is effected via a connection plug, disposed on the front wall 223 of the bottom shell 223 that has a plug housing 26 and plug contacts 27, which are extended to the outside from the bottom shell 22 in waterproof fashion. As shown in FIG. 12, to seal off the plug contacts 27, a rubber cuff 28 covering the inner opening of the plug housing 26 is inserted into the bottom shell 22 and has a slotlike perforation 281, whose slot length is only sightly greater than the smallest dimension of a tapering portion 271 of the plug contacts 27 near their free end. If a plug contact 27 is passed through the perforation 281 (FIG. 12*a*), the rubber cuff 28 presses tightly against the tapered portion 271 of the plug contact 27 (FIG. 12*b*).

Once the bottom shell 22, provided with the electronic unit 20, has been suspended inside the pole housing 11 and the electrical contact between the electronic unit 20 and the commutator brushes 17 has been made, the bearing lid 12, with the lid 23, formed integrally as a unitary, one-piece component with it, of the electronics housing 21, is mounted on the opening edge of the pole housing 11 (FIG. 2). Between the opening edge of the pole housing 11 and the bearing lid 12 is an encompassing tongue-and-groove labyrinth 29, extending around it, which assures tightness between the pole housing 11 and the bearing lid 12. The lid 23, formed onto the bearing lid 12, of the electronics housing 21 is secured to the bottom shell 30 by means of a snap connection 30.

Figure 3:
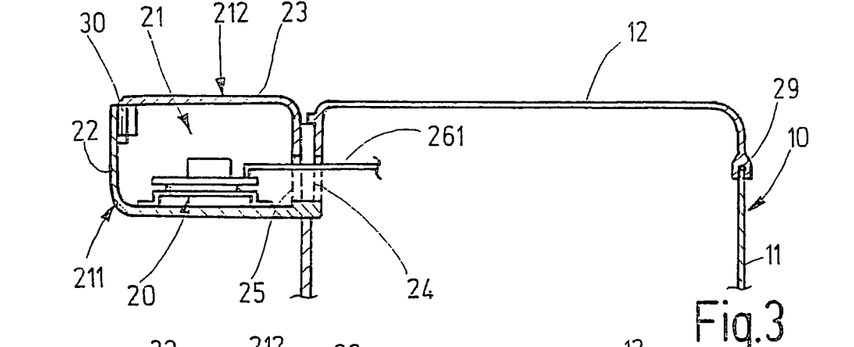
FIGS. 3–7 are each an identical view to FIG. 2 of five different exemplary embodiments.

In the exemplary embodiment of FIG. 3, the bottom shell 22 is likewise suspended from inside the pole housing 11, as described above. The lid 23 of the electronics housing 21 is embodied as a separate part, and after the bottom shell 22 has been equipped with the electronic unit 20, the lid 23 is press-fitted or snapped into the bottom shell 22 (snap connection 30).

Figure 4:
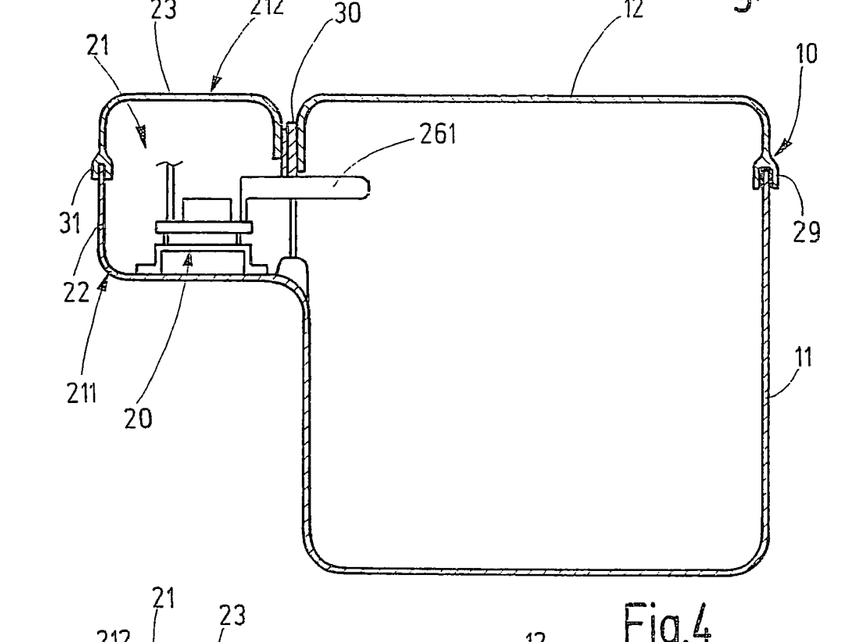
Figure 5:
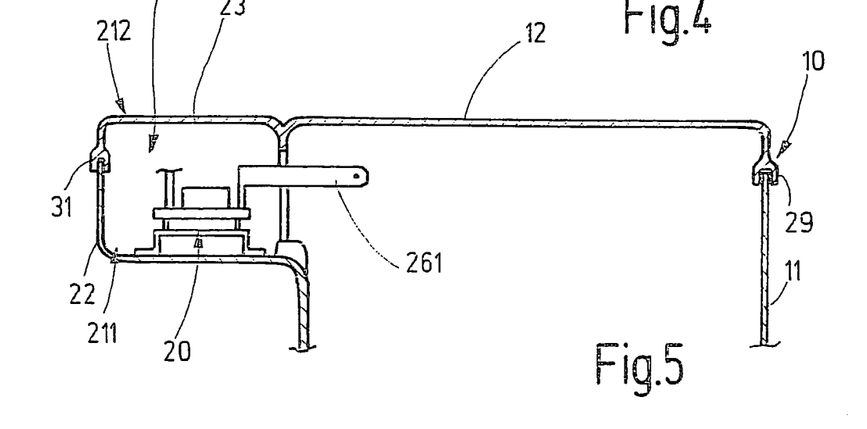

In the exemplary embodiment of FIG. 4, the bottom shell 22 is formed integrally as a unitary, one-piece component with the pole housing 11. The lid 23, embodied as a separate plastic part, of the electronics housing 21 is on the one hand put together with the bottom shell 21 in waterproof fashion with a tongue-and-groove labyrinth 31, and on the other is connected to the bottom shell 22 with a snap or press-fit connection 30. The bearing lid 12 mounted on the pole housing 11 is sealed off from the pole housing 11 by means of the tongue-and-groove labyrinth 29 and is fixed on the pole housing by means of an identical snap connection.

In the exemplary embodiment shown in fragmentary section in FIG. 5, once again the bottom shell 22 is formed integrally as a unitary, one-piece component with the pole housing 11. As in the exemplary embodiment of FIG. 2, the lid 23 of the electronics housing 21 is formed integrally onto the bearing lid 12. The bearing lid 12 and pole housing 11 are connected to one another in waterproof fashion by the tongue-and-groove labyrinth 29, and the housing shell 22 and the lid 23 of the electronics housing 21 are connected to one another in waterproof fashion by the tongue-and-groove labyrinth 31.

Figure 6:
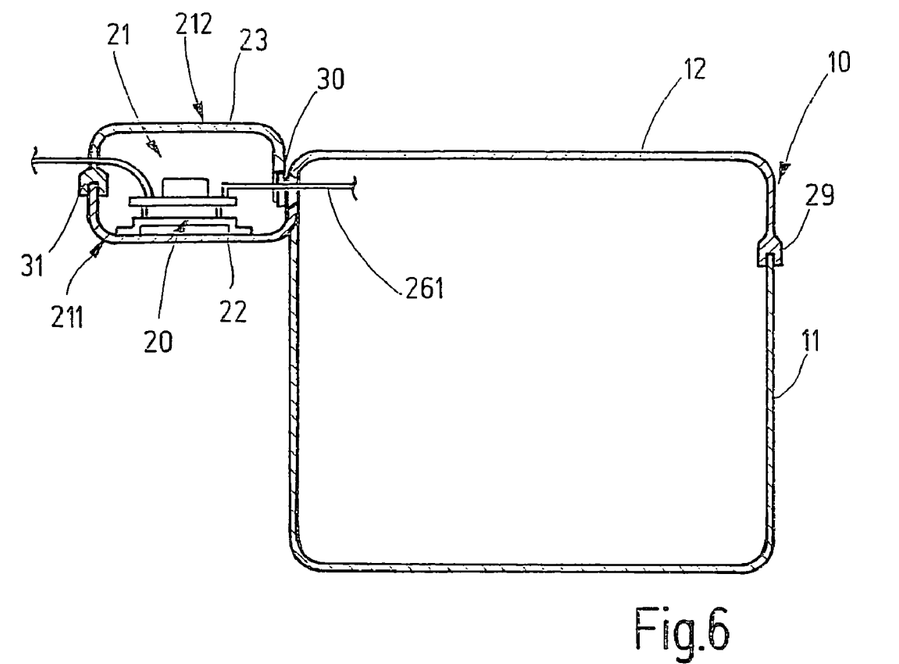

In the exemplary embodiment of FIG. 6, the bottom shell 22 is formed integrally as a unitary, one-piece component with the bearing lid 12. The lid 23 of the electronics housing 21 is—as in the exemplary embodiment of FIG. 4—mounted as a separate plastic part on the bottom shell 22 by means of a tongue-and-groove labyrinth 31 and is locked in the bottom shell by means of the snap connection 30.

Figure 7:
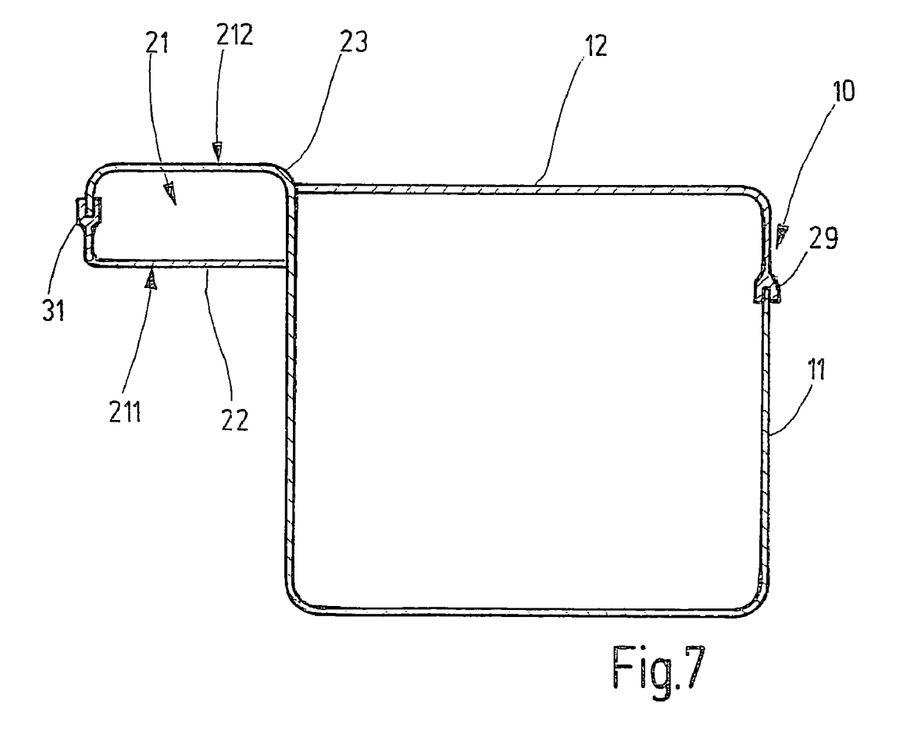

In the exemplary embodiment of FIG. 7, the lid 23 of the electronics housing 21 is formed integrally in the form of a cap as a unitary, one-niece component with the pole housing 11. The bottom shell 22 is mounted from below against the lid 23. The lid 23 and bottom shell 22 are once again joined tightly to one another via the tongue-and-groove labyrinth 31. An opening (not shown here) for the electrical connection between the electronic unit 20 and the commutator brushes 17 is provided in the cap edge of the bearing lid 12 which is once again caplike.

In FIG. 9, a modified electronics housing 21 is shown schematically in perspective. The attachment to the pole housing 11 and to the bearing lid 12 is not shown here, for the sake of simplicity. The tongue-and-groove labyrinth that connects the bottom shell 22 and the lid 23 of the electronics housing 21 to one another in waterproof fashion simultaneously serves to fix the two housing parts 211 and 212 together. To that end, two guide rails 32 are formed onto the inside of the bottom shell 22 and extend around it with parallel spacing in a U, or in other words extend over three peripheral sides of the bottom shell 22. One guide rail 32 is disposed directly on the open edge of the bottom shell 22. Between the two guide rails 32 extending in a U, the lid 23, embodied as a flat plate, of the electronics housing 21, on which the electronic unit 20 is disposed, can be thrust in by its edges. If the tongue-and-groove labyrinth that is formed by the guide rails 32 and by the edge of the lid 23 thrust into it is embodied with a dovetail profile, then an additional bracing of the two housing parts 211, 212 can be achieved. The tightness of the tongue-and-groove labyrinth is increased if a sealing rib 33 is provided between the guide rails 32, as is shown in fragmentary form in FIG. 11.

As FIG. 10 shows, the guide rails 32 can be provided with recesses 34; the recesses 34 are offset from one another in the parallel guide rails 32. Because of this design of the guide rails 32, the bottom shell 22, which is made of plastic, can be injection-molded along with the guide rails 32 without slides.

Figure 13:
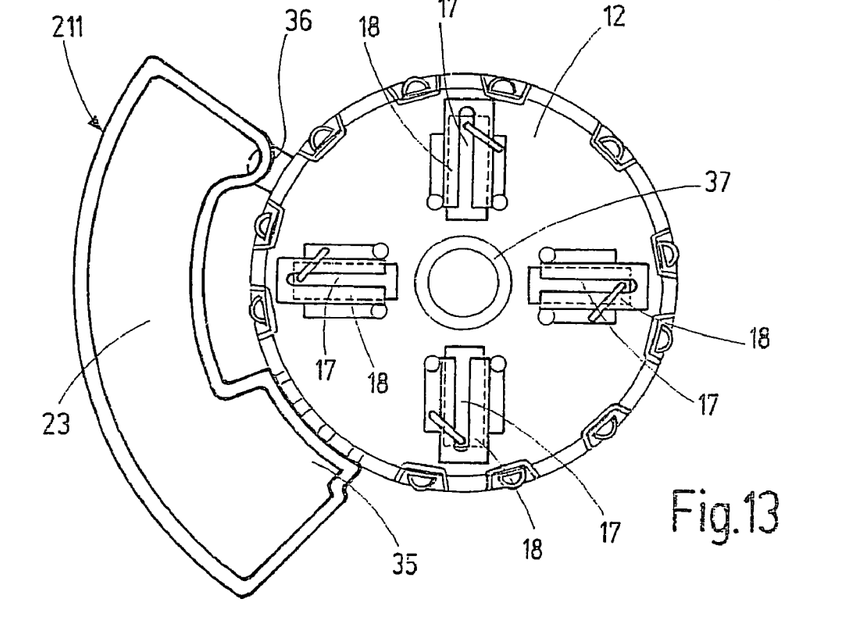
FIG. 13, a view from below of the motor housing bearing lid and of the electronics housing in a further exemplary embodiment.

In types of motors in which the electronics housing 21 protruding past the circular outline of the motor housing blocks off existing installation space, for instance for retaining arms of the motor to the vehicle or for air flows for dissipating heat of convection from the electric motor, the electronics housing 21 is secured with radial spacing from the motor housing 10 by means of struts 35, 36 spaced apart from one another in the circumferential direction. This type of disposition of the electronics housing 21 is shown in FIG. 13; FIG. 13 shows a view of the bearing lid 12 from below, and here the bearing lid simultaneously takes on the function of a brush holder. The quivers 18 with the commutator brushes 17 are secured to the underside of the bearing lid 12, which also has a bearing shell 37, formed into the underside, for receiving a rotary bearing for the rotary shaft 13. In the exemplary embodiment of FIG. 13, the lid 23 of the electronics housing 21 is attached to the bearing lid 12 by means of the aforementioned struts 35, 36, and the bottom shell 22 is secured to the lid 23. Alternatively, the bottom shell 22 can be attached to the pole housing 11 via the struts 35, 36, and the lid 23 of the electronics housing 21 can be secured to the bottom shell 22. The struts 35, 36 can be embodied integrally with one or the other of the housing parts 211, 212 of the electronics housing 21, or with one of the housing components 11 or 12. As before, at least one housing part 211, 212 of the electronics housing 21 can be formed together with the struts 35, 36 onto a respective housing component 11, 12 of the motor housing 10.

Figure 14:
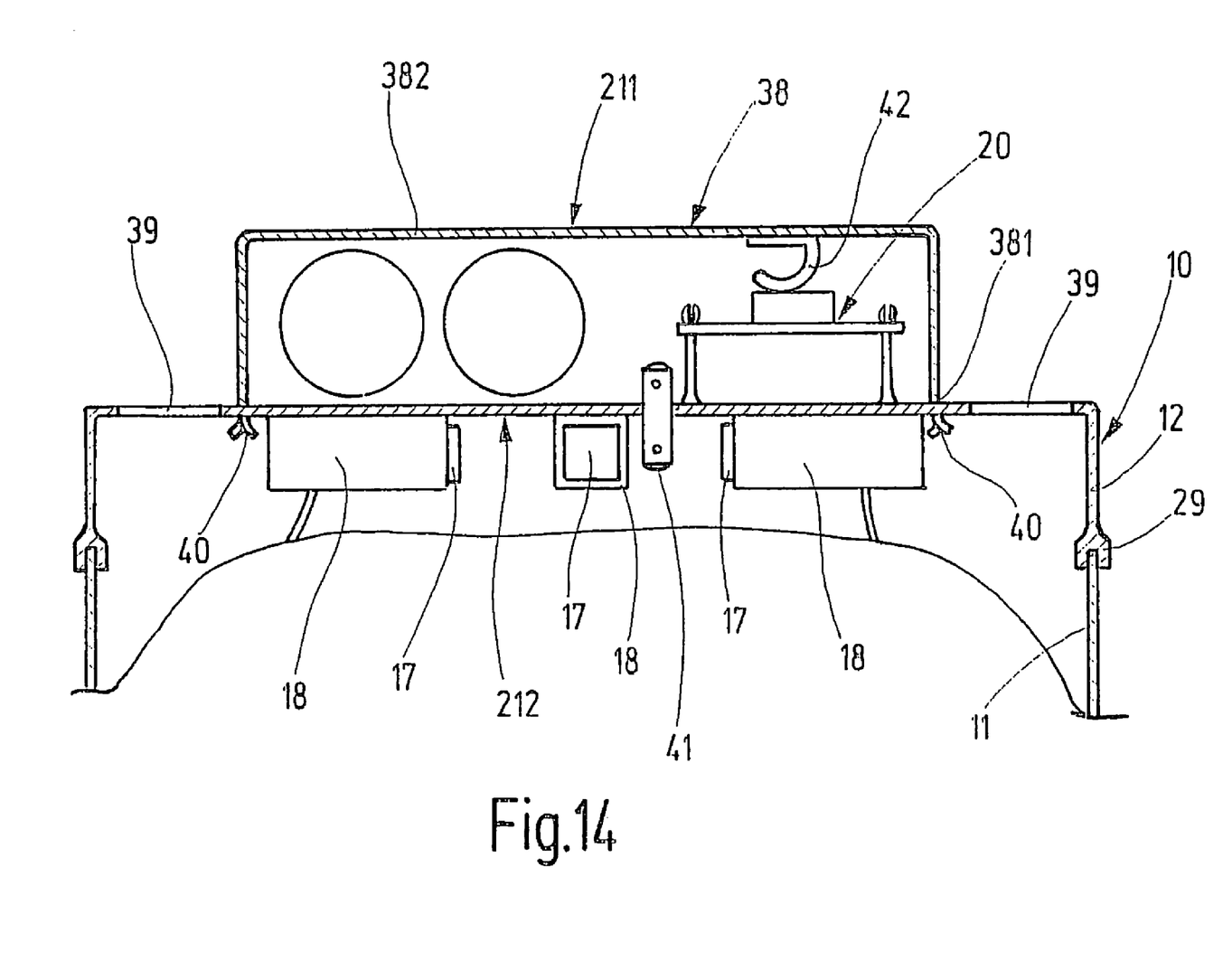
FIG. 14, a fragmentary longitudinal section of the motor housing and electronics housing, with the electronic unit contained in it, in a further exemplary embodiment.

In FIG. 14, a further exemplary embodiment of the electric motor is shown in fragmentary longitudinal section. Here one housing part 212 is formed by the bearing lid 12 itself, and the other housing part 211, which is embodied as a housing cap 38, is secured to the bearing lid 12 and covers only a central portion of the bearing lid 12. In the region remaining between the housing cap 38 and the edge of the bearing lid 12, air vent openings 39 for ventilating the electric motor or for dissipating hot air from the interior of the motor housing 10 are machined into the bearing lid 12 and disposed on a pitch circle. The housing cap 38 is mounted on the outside by its cap edge 381 on the bearing lid 12 and protrudes with fastening elements 40 through corresponding recesses in the bearing lid 12. These fastening elements 40 are braced on the inside of the bearing lid 12.

The bearing lid 12 at the same time takes on the function of the brush holder. Of the total of four commutator brushes 17, offset from one another by 90° of circumference and resting on the commutator 16 when the rotor 14 has been installed, three can be seen in FIG. 14, each guided axially displaceably in a respective quiver 18. The quivers 18 are secured on the inside of the bearing lid 12. The electrical connection between the electronic unit 20 and the commutator brushes 17 is made by contact struts 41, which are passed through the bearing lid 12 in the region of the bearing lid that is covered by the housing cap 38. The housing cap 38 is made of highly heat-conducting material, such as metal. Thus the housing cap 38 can be used both to dissipate the heat of convection generated by the electronic unit 20 and as a cooling sink for some of the electronic components. To that end, the electronic unit 20 is advantageously disposed on the cap bottom 382 of the housing cap 38. In the exemplary embodiment of FIG. 14, conversely, the electronic unit 20 is fixed on the bearing lid 12. To enable utilizing the housing cap 38 as a cooling sink in that case, a heat-conducting bridge 42 is disposed between the electronic component or components that require a cooling sink, on the one hand, and the housing cap 38, on the other. Once again, the bearing lid 12 is mounted on the face end of the pole housing 11 and is sealed off via a tongue-and-groove labyrinth 29. This structural embodiment of the electronic unit is especially suitable for those applications in which there is no available installation space beyond the circular outline of the motor housing 10.

The foregoing relates to preferred exemplary embodiments of the invention, it being understood that other variants and embodiments thereof are possible within the spirit and scope of the invention, the latter being defined by the appended claims.

The invention claimed is:

1. An electric motor for blowers in motor vehicles, the electric motor comprising
   a motor housing (10), which includes as its housing components a pole housing (11) and a bearing lid (12) mounted on the pole housing, and
   an electronics housing (21) for receiving electronic components of an electronic unit (20),
   the electronics housing (21) being embodied in two parts (211, 212) at least one of which is attached to a housing component (11, 12) of the motor housing, wherein the at least one housing part (211, 212) of the electronics housing (21) is integrally formed as a unitary, one-piece component with the housing component (11, 12) of the motor housing (10), wherein one housing part (211) of the electronics housing (21) is embodied as a bottom shell (22) radially protruding from the motor housing (10), said bottom shell having a bottom wall closing one end of the bottom shell and at least one side wall extending beyond the bottom wall.

2. The electric motor of claim 1, further comprising radially extending struts (35, 36) disposed between the at least one housing part (211) of the electronics housing (21) and the associated housing component (12) of the motor housing (10), said struts (35, 36) being spaced apart in the circumferential direction to thereby create a radial clearance between the electronics housing (21) and the motor housing (10).

3. The electric motor of claim 1, wherein the two housing parts (211, 212) are solidly connected to one another.

4. The electric motor of claim 3, wherein the connection is made by means of a tongue-and-groove labyrinth (31) that is effective between the housing parts (211, 212).

5. The electric motor of claim 4, wherein the tongue-and-groove labyrinth comprises a sliding connection having two guide rails (32) extending around the inside in a generally U-shaped pattern with parallel spacing on one housing part (211), whereby the other housing part (212) can be thrust by its edges between the guide rails (32).

6. The electric motor of claim 5, wherein each guide rail (32) has recesses (34) formed therein, and wherein the recesses (34) in the two guide rails (32) are offset from one another in the longitudinal direction.

7. The electric motor of claim 5, further comprising a sealing rib (33) disposed between the two guide rails (32) (FIG. 11).

8. The electric motor of claim 1, wherein the other housing part (212) of the electronics housing (21) is embodied as a lid (23) that tightly closes the bottom shell (22).

9. The electric motor of claim 8, wherein the lid (23) of the electronics housing (21) is formed integrally on the bearing lid (12), and wherein the bearing lid includes a bearing (37).

10. The electric motor of claim 8, wherein the lid (23) of the electronics housing (21) is formed integrally on the pole housing (11).

11. The electric motor of claim 8, wherein the lid (23) of the electronics housing (21) is formed integrally on both the bearing lid (12) and the bottom shell (22) of the electronics housing (21) is formed integrally on the pole housing (11).

12. The electric motor of claim 8, wherein the bottom shell (22) of the electronics housing (21) is formed integrally on the pole housing (11).

13. The electric motor of claim 8, wherein the bottom shell (22) of the electronics housing (21) is integrally formed on the bearing lid (12).

14. The electric motor of claim 8, wherein the bottom shell (22) is suspended from inside the pole housing (11).

15. The electric motor of claim 1, further comprising a commutator (16) and commutator brushes (17) that press against the commutator (16), the commutator brushes (17) being retained on the bearing lid (12).

16. An electric motor for blowers in motor vehicles, the electric motor comprising a motor housing (10), which includes as its housing components a pole housing (11) and a bearing lid (12) mounted on the pole housing, and an electronics housing (21) for receiving electronic components of an electronic unit (20).

the electronics housing (21) being embodied in two parts (211, 212) at least one of which is attached to a housing component (11, 12) of the motor housing, wherein the at least one housing part (211, 212) of the electronics housing (21) is integrally formed as a unitary, one-piece component with the housing component (11, 12) of the motor housing (10), wherein one housing part (212) is formed by the bearing lid (12) which mounts a bearing, and on which the other housing part (211), embodied as a housing cap (38), is mounted axially.

17. The electric motor of claim 16, wherein the housing cap (38) is fastened centrally on the bearing lid (12), and wherein ambient air openings (39) are located on the periphery in the bearing lid (12).

18. The electric motor of claim 16, wherein the housing cap (38) is made from heat-conducting material, and wherein the electronic unit (20) is disposed on the cap bottom (382), which is formed by the bearing lid.

19. The electric motor of claim 16, further comprising a commutator (16) and commutator brushes (17) that press against the commutator (16), the commutator brushes (17) being retained on the bearing lid (12), the electronic unit (20) being disposed on the bearing lid (12) on the side remote from the commutator brushes (17) and being connected electrically to the commutator brushes (17) via contact struts (41) that are passed through the bearing lid (12).

* * * * *